United States Patent
Arab-Sadeghabadi et al.

(10) Patent No.: US 6,217,229 B1
(45) Date of Patent: Apr. 17, 2001

(54) FIBER OPTIC CONNECTOR WITH DOWEL ALIGNMENT OF MATING MEMBERS

(75) Inventors: Akbar Arab-Sadeghabadi, Simi Valley; Agop H. Cherbettchian, Santa Monica, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/126,579

(22) Filed: Jul. 30, 1998

(51) Int. Cl.[7] .................................................. G02B 6/38
(52) U.S. Cl. .................................. 385/60; 385/53; 385/72
(58) Field of Search .............................. 385/53, 55, 59, 385/60, 71, 72, 77, 89

(56) References Cited

U.S. PATENT DOCUMENTS 5,590,229 * 12/1996 Goldman et al. ...................... 385/59

* cited by examiner

Primary Examiner—Phan T. H. Palmer
(74) Attorney, Agent, or Firm—Elliott N. Kramsky

(57) ABSTRACT

A connector includes a pair of connector members for simultaneously contacting a first plurality of optical fibers with a second plurality of optical fibers. A cup for fixing the ferrule-tipped ends of mating optical fibers is wholly contained within each of a plurality of channels through the members. The cup is capable of axial movement within a channel through a body element of a connector member. A spring member is located in the channel between a back plate and the cup to act upon the base of the cup. Aligned dowel channels are provided for receiving a thick external dowel that resides within the aligned dowel channels of the body member of one of the connector members and the holder of the other. An internal dowel is press fit within the body element and holder dowel channels of the other connector member to enhance the ruggedness and durability of the device.

5 Claims, 4 Drawing Sheets

FIBER OPTIC CONNECTOR WITH DOWEL ALIGNMENT OF MATING MEMBERS

The invention herein claimed was made under contract number N66604-95-C-0004 with the United States Navy.

BACKGROUND

1. Field of the Invention

The present invention relates to a connector for use with a fiber optic sensor array system. More particularly, this invention pertains to a connector for simultaneously completing a plurality of reliable low-loss optical interconnections between the upstream on-board elements (e.g. source and photodetector) and downstream elements such as an optical cable or a towed array of hydrophones.

2. Description of the Prior Art

U.S. Pat. No. 5,590,229 of Goldman et al. covering "Multichannel Fiber optic Connector" addresses problems posed, for example, by hydrophone arrays that require maintenance of multiple reliable optical contacts within the operational environment. Optical fiber connections, unlike electrical connections, require precise alignments of mating fibers and are subject to significant degradation by environmentally-related factors. The failure to obtain precise alignment of fiber terminations can contribute significantly to optical signal loss.

The device disclosed in the patent includes a two-part connector, each half accommodating a plurality of optical fibers for simultaneously completing optical-quality connections between paired fibers. One fiber is accommodated in one half of the connector and the other held in the other half. The connector provides an interface for coupling optical signals from the hydrophones of either a towed or planar array to upstream shipboard elements including, for example, a laser source, a photodetector and processing electronics. Should a grouping of seven (7) hydrophones be employed, for example, a total of fifteen (15) fiber couplings must be accomplished by the connector.

The device of the referenced patent is designed for extremely high performance applications characterized by very high return loss in operation. This results in a rather complex and difficult-to-manufacture structure that is necessarily quite costly. In the device of the patent, multiple optical fibers with ferrule terminations are spring-loaded within a plurality of internal channels of each of the connector halves. The stringent return loss requirements demand that not only axial, but also rotational, alignment be maintained between the faces of contacting fibers. As a consequence, the faces of the ferrules are angularly-inclined, necessitating a rotational alignment structure for assuring that mating angular alignments are simultaneously obtained among the plurality of pairs of fibers housed in the two connector halves.

The structures required for rotational alignment include the keyed ends of the cups into which the ferrules are inserted, in combination with the slotted rear faces of body elements of the male and female connector halves. The fabrication of each of such elements is complex and requires precision machining, reducing yield while increasing cost and complexity.

In contrast to the types of optical interconnections and associated connectors required to maintain rotational, as well as axial, alignment precision in the most demanding applications, there exist many useful applications that do not require rotational alignment between mating optical fibers for satisfactory performance. FIGS. 1(a) and 1(b) are side sectional views illustrating a ferrule 10 having a symmetrical face (as opposed to one that is angularly-inclined for rotational alignment). Such a ferrule 10 is suitable for optical interconnections in numerous, primarily non-military, applications.

The ferrule 10 comprises a generally cylindrical elongated body with an outer shell 12, preferably of tungsten carbide, that encloses a filler material 14 (preferably a relatively soft silver/nickel alloy). The filler material 14 encircles an optical fiber 16, substantially encapsulating it within a shaped fitting 18 of EPOXY or like adhesive. A brass element 20 stiffens the fiber 16. An outer plastic coating 22 is stripped from the fiber 16.

FIG. 1(b) is an enlarged and detailed view, taken at line 1(b) of FIG. 1(a), of the terminal end of the optical fiber 16 in optical contact with an optical fiber 16' (shown in shadow outline). The fibers 16 and 16' include polished termination end faces 24, 24' that are continuations of, and substantially coextensive with, faces 26 and 26' of the respective ferrules. It is to be noted that the end faces 24 and 24' and the faces 26 and 26' are symmetrically rounded about the cores of the optical fibers 16 and 16'. Thus, there exists a small region of mutual tangency between the fibers 16 and 16', facilitating the transmission of optical signals therebetween. Also, oppositely-acting axial compression forces (introduced by springs) tend to flatten the rounded end faces slightly in the region of mutual tangency. The area of intimate contact between the aligned faces is thereby slightly enlarged and stabilized to enhance the quality of the optical interconnection in a manner that is entirely satisfactory for all but the most demanding optical communication criteria.

SUMMARY AND OBJECTS OF THE INVENTION

It is therefore an object of the present invention to provide a multichannel optical connector that achieves economies over that disclosed in U.S. Pat. No. 5,590,229 for applications that do not require rotational alignment between contacting optical fibers.

The preceding object is addressed by the present invention that provides a fiber optic connector. The connector includes a pair of mateable connector members. Each member comprises a body element having at least one channel therethrough that is adapted to receive a ferrule-tipped optical fiber. A cap is provided for fixedly receiving the ferrule. Such cap is of substantially-cylindrical shape.

At least one body element dowel channel is provided in each of the body elements with the dowel channels of the body elements being aligned with one another when the connector members are coupled to one another. A first connector member includes a holder located flush against the body element. The holder has at least one holder dowel channel aligned with a body element dowel channel. An internal dowel is captured within the aligned body element and holder dowel channels of the first connector member.

The preceding and other features and advantages of the present invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

DETAILED DESCRIPTION OF THE PREFERRED EMBODIMENT

Figure 1A:
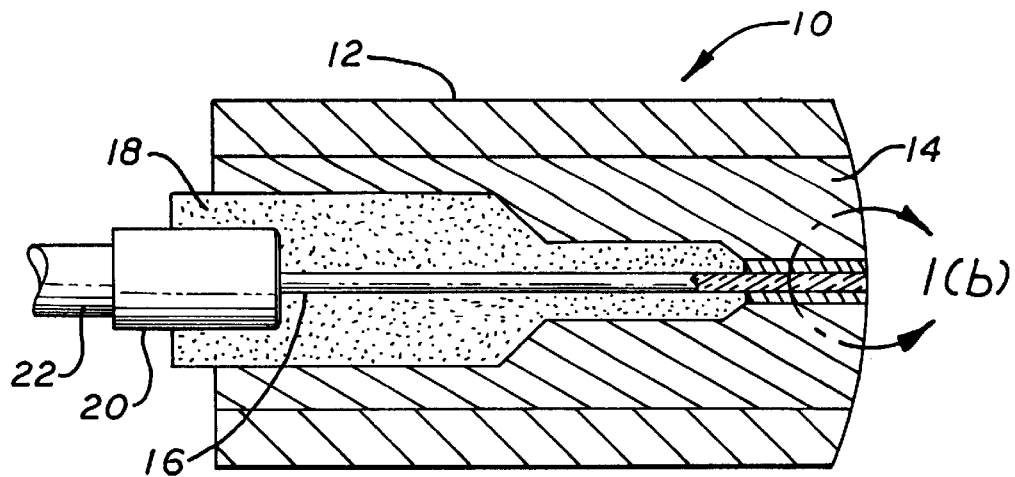
FIGS. 1(a) and 1(b) are a side sectional view of a ferrule termination of a type suitable for incorporation into a multiple optical connector in accordance with the invention and a greatly enlarged and detailed view of a portion of the terminal end of the optical fiber within that ferrule and a mating optical fiber (shown in shadow outline), respectively.
Figure 1B:
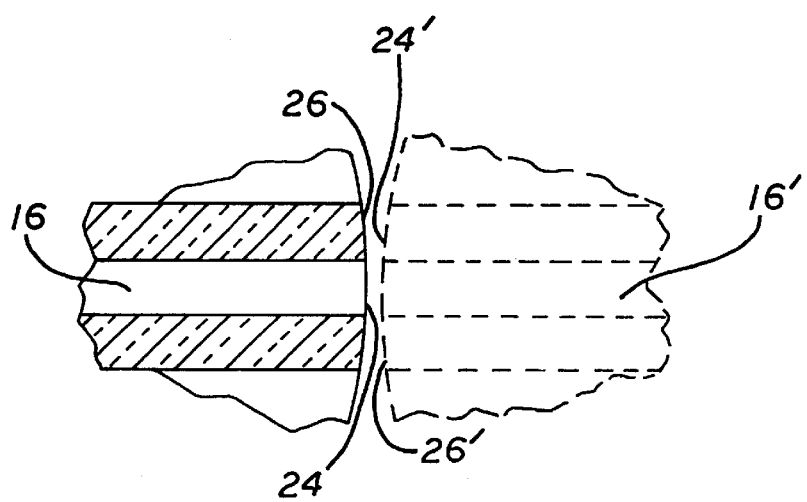
Figure 2A:
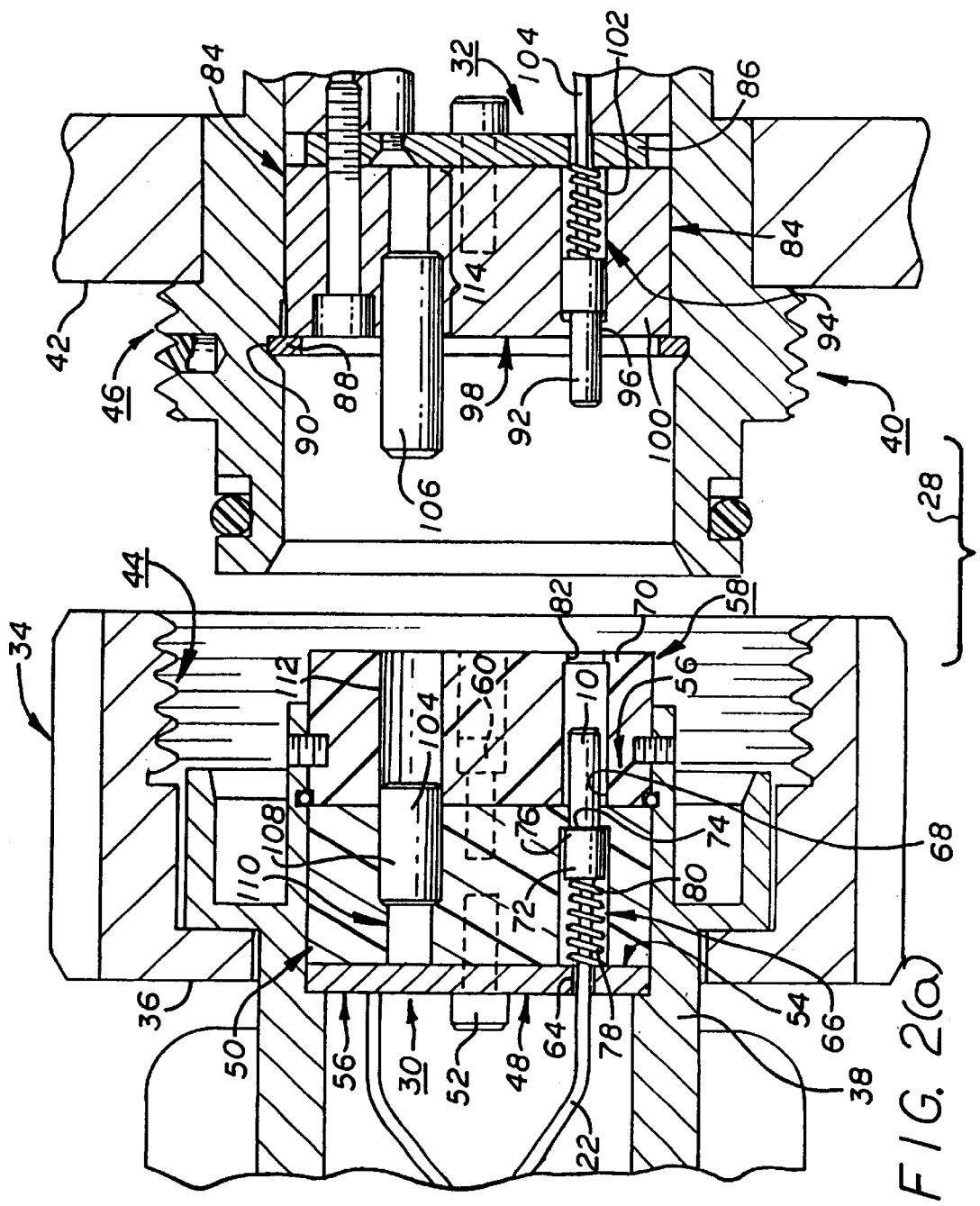
FIGS. 2(a) and 2(b) are side sectional views of the multichannel fiber optic connector of the invention with mating connector members disengaged and engaged respectively.
Figure 2B:
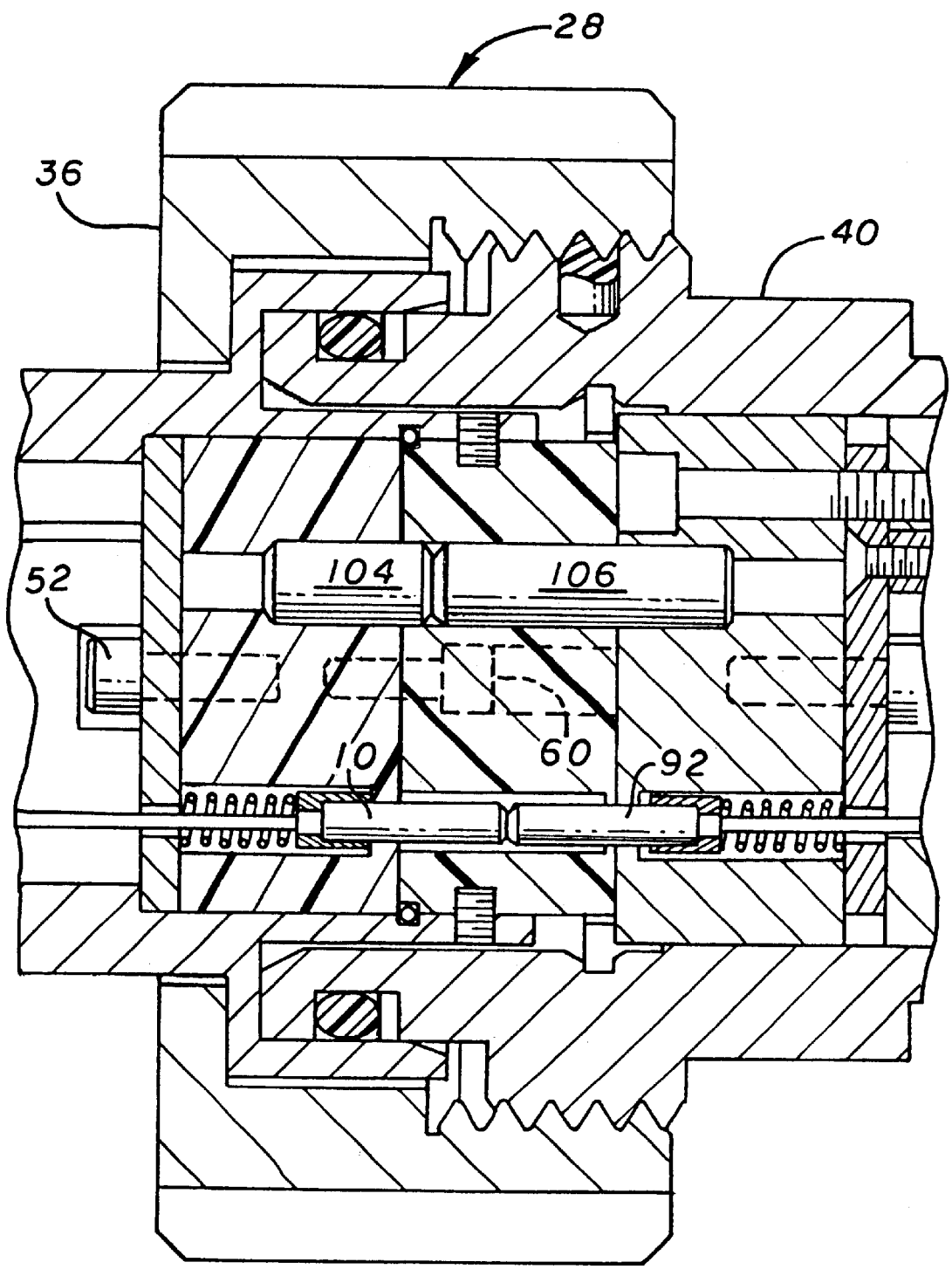

FIGS. 2(a) and 2(b) are side sectional views of the fiber optic connector 28 of the invention with mating connector members 30 and 32 disengaged and engaged respectively. The connector 28 of the invention provides a low cost, easy-to-manufacture version of that disclosed in U.S. Pat. No. 5,590,229 for "Multichannel Fiber Optic Connector". The teachings and disclosure of that patent, property of the assignee herein, are hereby incorporated by reference. It should be kept in mind during the discussion that follows that, while the details of only a single fiber-to-fiber optical connection is visible, the connector 28 facilitates and enables the simultaneous completion of a plurality of independent fiber-to-fiber connections of good optical quality. The extension of the teachings herein to a large plurality of optical connections is illustrated and taught in U.S. Pat. No. 5,590,229.

Referring first to the connector member 30, such member is contained within a male housing or plug 34. The rear portion of the plug 34 includes an annular shoulder 36 for capturing the proximate end of a hose-like rubber casing 38 that encloses an aligned plurality of hydrophones (not shown) which constitutes the downstream or sensing portion of the sensing system. The connector member 32 is contained within a female housing or receptacle 40 which may comprise a portion of the hull penetrator 42 of a vessel. The rear portion of the connector member 32 extends within the vessel and accommodates optical fibers leading to the upstream or on-board elements of the sensing system, such as a laser source and a photodetector (not shown). The front portion of the plug 34 includes internal threading 44 while the receptacle 40 includes exterior threading 46 for securing the two members together as shown in FIG. 2(b).

Referring to FIGS. 2(a) and 2(b) in combination, the member 30 includes a back plate 48 which abuts and is in direct contact with a body element 50, being secured thereto by means of a screw 52. The body element 50, having opposed planar faces 54 and 56, lies in a flush, abutting relationship against both the back plate 48 and an adjacent holder 58. A screw 60 is countersunk into the planar front surface 62 of the holder 58 for securing the holder 58 to the body element 50.

The representative optical fiber 22 enters the member 30 through an aperture 64 within the back plate 48. The aperture 64 is aligned with an internal channel of the member 30. Such channel comprises an enlarged diameter portion 66 aligned with and connected to a smaller diameter portion 68 within the member 30. The adjacent holder 58 includes an internal channel 70 which is in substantial axial alignment with the aforesaid channel that passes through the body element 50.

A cup 72 lies completely within the enlarged diameter portion 66 of the channel of the body element 50. This is in contrast to the type of cup employed in the device of U.S. Pat. No. 5,590,229 whose keyed end is captured outside the body element 50 by one of a plurality of grooves within the back plate of the connector. It will be shown below that the design of the cup 72 is simplified when compared to that of the referenced United States patent. The simplification of the cup 72 is accompanied by simplification of the design of the back plate 48 in view of the suitability of ferrules (and associated fibers) having symmetrically-rounded tips for numerous commercial applications. Generally, the suitability of ferrules having symmetrically-rounded (as opposed to angularly-inclined) faces reflects the absence of any necessity for rotational alignment between contacting fibers. In the prior art patent, the need for rotational alignment led to complex, difficult-to-machine cup and back plate structures.

The face 74 of the cup 72 abuts an internal annular ridge 76 defined by the transition between the enlarged diameter portion 66 and the smaller diameter portion 68 of the channel through the body element 50. The ferrule 10 is fixed to the cup 72 and extends through the face 74 and into the channel 70 that passes through the holder 58. A spring 78 is seated within the enlarged diameter portion 66 of the channel. As compressed, it exerts a force to urge the cup 72 away from the back plate 48. One side of the spring 78 acts against the front planar surface of the back plate 48 (in the region adjacent the aperture 64) while the other end of the spring 78 acts against the rear base 80 of the cup 72. The channel 70 terminates at an aperture 82 within the front face 74.

Figure 3:
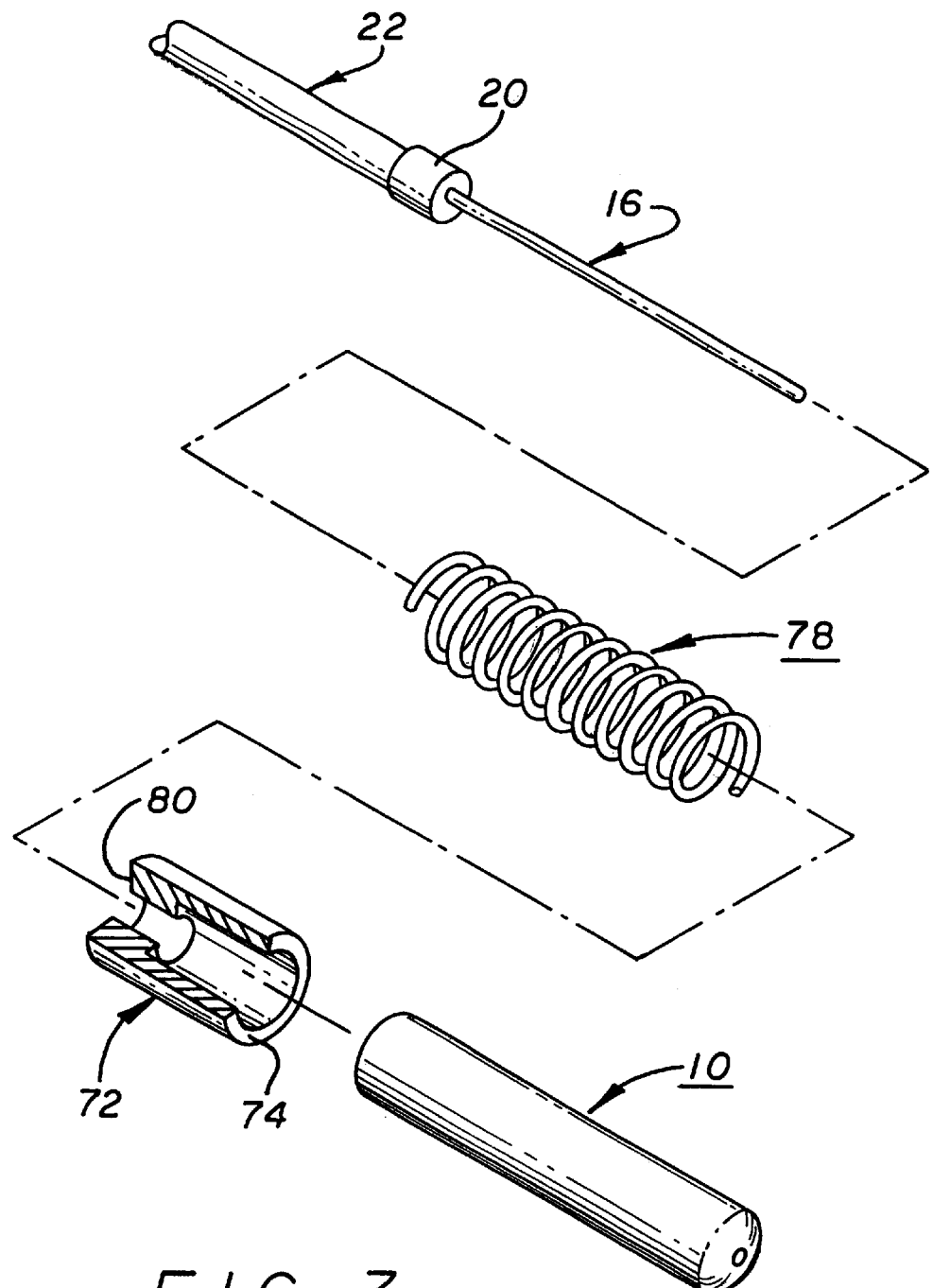
FIG. 3 is an exploded perspective view of assemblies associated with a representative ferrule and optical fiber that render the ferrule subject to precise and reliable axial alignment within a connector channel.

The above-described structures pertaining to the spring-loaded mechanism for urging an individual optical fiber 22 into contact with an abutting fiber (discussed below) are illustrated in FIG. 3, an enlarged perspective view of assemblies associated with a representative ferrule 10 and optical fiber 22 that render the fiber 22 subject to precise and reliable axial alignment within a connector channel. As may be seen, the cup 72, which is suitable for positioning a ferrule 10 having a symmetrically rounded face, is of simplified and relatively easy-to-manufacture design as opposed to that of U.S. Pat. No. 5,590,229. Unlike the cup of the referenced patent, the cup 72 is shorter to allow the spring 78 to abut the rear base 80 and requires no difficult-to-machine key or tab for engaging a slotted back plate.

Returning to FIGS. 2(a) and 2(b) and referring to the connector member 32, such member is seen to differ from the member 30 principally insofar as it does not include and element corresponding to the holder 58. The member 32 does, however, include both a body element 84 and an end plate 86 that are substantially identical to the corresponding elements of the member 30. The structures of the member 32 are held within the receptacle housing 40 by means of an annular ring 88 that is received within an interior annular groove 90 of the housing 40.

A ferrule 92 extends outwardly from a channel 94 and through an aligned aperture 96 in the face 98 of the body element 100 of the connector member 32. The apertures 82 and 96, as well as the respective channels within the connector members 30 and 32 are axially aligned and in registry with respect to one another so that, when the connector members 30 and 32 are mutually engaged as shown in FIG. 2(b), the ends of the ferrules 10 and 92 that extend beyond the channels within the body elements 50 and 100 respectively enter and make face-to-face contact within the channel 70 of the holder 58 of the member 30. The contacting faces of the ferrules 10, 92 are mutually urged toward one another by the action of the springs 78 and 102, providing a compressive force to form a solid optical path between the cores of the fibers 22 and 104 that are mounted within the ferrules 10 and 92 respectively.

The springs 78, 102 (as well as like springs similarly situated in the multichannel connector of the invention) take up ferrule tolerance and length variations from optically contacting ferrule pair-to-ferrule pair. As a result, compression forces, within tolerable limits, are experienced at each pair of contacting fiber faces in contrast to so-called "hard" connections. This is particularly important in view of the small areas and critical sensitivities associated with fiber-to-fiber couplings.

Aligned pairs of dowels assure the durability of the connector 28 during use and guard against decoupling of the members 30 and 32. One such pair comprises dowels 104 and 106. The internal dowel 104 fits tightly within the member 30 in a channel that spans the body member 50 and the holder 58. The internal dowel 104 is press-fit within the large diameter portion 108 of a dowel channel that runs through the body element 50, there also existing an aligned small diameter portion 110. The fit between the internal dowel, the enlarged diameter channel 108 and an aligned channel 112 (of slightly larger diameter) that passes through the holder 58 is sufficiently tight to insure that the internal dowel 104 may only be removed through the application of substantial force. The mere coupling and uncoupling of the members 30 and 32 to one another will not normally provide sufficient force to remove the internal dowel 104 from the channel 108.

A dowel channel 114 through the body element 100 of the member 32 is a mirror image of the dowel channel comprising the aligned portions 108, 110. The external alignment dowel 106 is press-fit within the larger diameter portion of the channel 114. Again, the external dowel 106 may typically be removed only by the application of considerable force exceeding that required to couple and uncouple the members 30 and 32.

Upon coupling of the members 30 and 32, that portion of the alignment dowel 106 extending outwardly beyond the face 98 of the body element 106 is received within the channel 112 of the holder 58. As mentioned above, the diameter of the channel 112 is marginally larger than the wider diameter portions of the dowel channels within the body elements of the members 30 and 32. While the fit of the external dowel 106 within the holder channel 112 is of very high tolerance, the dowel 106 is slidable therein with relative ease. In this way, the external dowel 106 offers no significant resistance to coupling and uncoupling actions.

The relatively substantial sizes (thicknesses) of the alignment dowels 104 and 106 add considerable strength to the connection between the members 30 and 32. Thus, the dowels 104 and 106 not only facilitate the initial alignment process, but thereafter offer considerable structural integrity to the connection. The dowels 104, 106 are capable of absorbing substantial torque-force loads to thereby preserve and maintain the optimal connections between abutting ferrules during use.

The connector of the present invention is particularly adapted for installed hardware on submarines, and has been configured to accommodate a significant number of ferrules, and hence connections for transmission of light through a length of fiber optic material. The elimination of upstanding keys from the ends of ferrule-retaining cups allows the accommodation of significantly more channels per square inch. As many as fifty connections can now be placed within the connector as a result of the compactness of the ferrule and cup arrangement.

The alignment dowels of the present invention also play a significant role in increased connector efficiency. Since less space is required for a given number of connections within the connector, a more substantial alignment dowel and support can be provided. The dowels not only facilitate initial alignment but assure a much stronger connection enabling the connector to withstand significantly more shock and much higher torque forces.

While this invention has been described with reference to its presently-preferred embodiment, it is not limited thereto. Rather, this invention is limited only insofar as it is defined by the following set of patent claims an includes within its scope all equivalents thereof.

What is claimed is:

1. A fiber optic connector comprising, in combination:
   a) a pair of mateable connector members;
   b) each of said members comprising a body element having at least one channel therethrough adapted to receive a ferrule-tipped optical fiber;
   c) a cup for fixedly receiving said ferrule;
   d) said cup being of substantially cylindrical shape;
   e) at least one body element dowel channel in each of said body elements respectively, said dowel channels of said body elements being aligned with one another when said connector members are coupled to one another;
   f) a first connector member including a holder located flush against the body element thereof;
   g) said holder having at least one holder dowel channel, said at least one holder dowel channel being aligned with a body element dowel channel; and
   h) an internal dowel, said internal dowel being captured within said aligned body element and holder dowel channels of said first connector member.

2. A connector as defined in claim 1 wherein:
   a) each internal channel has a wide diameter portion and a reduced diameter portion at an end remote from said back plate, an annular step being formed at the transition between the wide diameter portion and the reduced diameter portion;
   b) said cup includes annular rim; and
   c) said annular rim of said cup abuts against said annular step in the internal channel.

3. A connector as defined in claim 1 wherein said cup further includes:
   a) a base having an aperture therein; and
   b) one end of said ferrule being attachable to said base with the optical fiber upon which said ferrule is mounted passing through said aperture.

4. A connector as defined in claim 1 further including:
   a) a back plate located flush against the rear of each of said body elements;
   b) each of said back plates having an aperture aligned with said at least one channel;
   c) a spring within said channel adjacent said back plate; and
   d) opposed ends of said spring abutting said back plate and said base of said cup.

5. A connector as defined in claim 1 further including equiangularly-spaced aligned dowel channels within said connector members.

* * * * *